No. 800,784. PATENTED OCT. 3, 1905.
E. C. BAILEY.
CUSHIONED TIRE.
APPLICATION FILED MAR. 23, 1905.
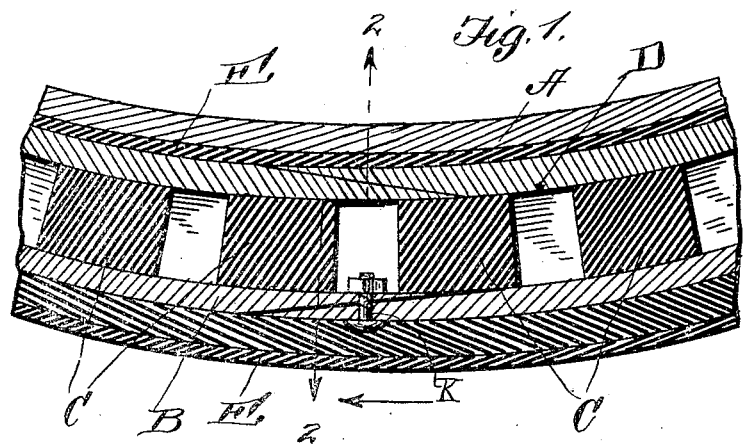
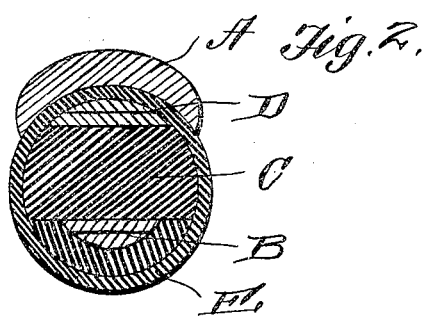
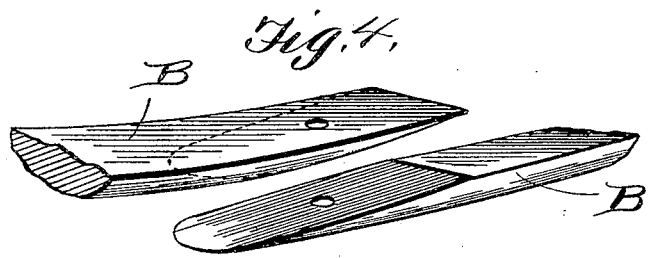
Witnesses
R. A. Boswell
Clara S. Davenport
Inventor
Edward C. Bailey
By Franklin H. Hough
Attorney

UNITED STATES PATENT OFFICE.

EDWARD CLAYTON BAILEY, OF CROMWELL, CONNECTICUT.

CUSHIONED TIRE.

No. 800,784.      Specification of Letters Patent.      Patented Oct. 3, 1905.

Application filed March 23, 1905. Serial No. 251,619.

*To all whom it may concern:*

Be it known that I, EDWARD CLAYTON BAILEY, a citizen of the United States, residing at Cromwell, in the county of Middlesex and State of Connecticut, have invented certain new and useful Improvements in Cushioned Tires; and I do declare the following to be a full, clear and exact description of the invention, such as will enable others skilled in the art to which it appertains to make and use the same, reference being had to the accompanying drawings, and to the letters of reference marked thereon, which form a part of this specification.

This invention relates to new and useful improvements in cushion-tires; and it consists in the provision of a tire made up of a series of cushions which are spaced apart, the outer marginal edges of said cushions bearing against an outer wooden hoop, while their inner portions bear against a similar inner hoop the ends of which are unfastened and are allowed to slide one over the other, the whole being surrounded by a suitable cover.

The invention consists, further, in various details of construction and in combinations and arrangements of parts which will be hereinafter fully described and then specifically defined in the appended claim.

My invention is illustrated in the accompanying drawings, which, with the letters of reference marked thereon, form a part of this application, and in which drawings—

Figure 1 is a longitudinal sectional view through a tire made in accordance with my invention. Fig. 2 is a cross-sectional view on line 2 2 of Fig. 1. Fig. 3 is a detail view of an inner wooden hoop which is adapted to be seated in the tire adjacent to the rim and the ends of which are unfastened and adapted to slide one over the other, and Fig. 4 is a view of the outer hoop the ends of which are fixed together.

Reference now being had to the details of the drawings by letter, A designates the rim of a wheel which is concave on one side, and B is a wooden hoop the ends of which overlap and are fixed together by means of a bolt K.

C C designate series of cushions, preferably of rubber, which are mounted upon the inner flat surface of said hoop B, and D designates a wooden hoop the ends of which overlap and are adapted to slide one over the other, said hoop D resting upon the inner faces of said cushions. A cover E, of rubber, surrounds the two hoops B and D and the intervening cushions, which are spaced apart, thus securely holding the parts together and to the rim A.

By the provision of a tire made in accordance with my invention it will be observed that means is provided for taking up vibration by the arrangement of the series of cushions, which are spaced apart, and providing a tire in which there is no danger of punctures. By the formation of the hoop D provision is made to allow the tire to spring into the concaved groove of the rim of a wheel.

While I have shown a particular detailed construction of tire embodying the features of my invention, it will be understood that I may vary the details of the same, if desired, without in any way departing from the spirit of the invention.

Having thus fully described my invention, what I claim as new, and desire to secure by Letters Patent, is—

A cushioned tire comprising an inner hoop which is convexed upon its inner surface and flat upon its outer face, the ends of said hoop overlapping and beveled and adapted to slide one over the other, an outer hoop with its outer face convexed and inner face flat, the ends of said outer hoop overlapping each other and fixed together, a series of cushions which are rectangular outlined in section, against which the inner flat faces of said hoops bear, and a covering surrounding the hoops and cushions, as set forth.

In testimony whereof I hereunto affix my signature in presence of two witnesses.

EDWARD CLAYTON BAILEY.

Witnesses:
     THOMAS W. BEAUMONT,
     ARTHUR BOARDMAN.